(12) United States Patent
Sim et al.

(10) Patent No.: US 8,155,386 B2
(45) Date of Patent: Apr. 10, 2012

(54) METHOD AND APPARATUS FOR OBTAINING DEPTH INFORMATION

(75) Inventors: Jae-young Sim, Yongin-si (KR);
Do-kyoon Kim, Seongnam-si (KR);
Kee-chang Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 943 days.

(21) Appl. No.: 12/081,501

(22) Filed: Apr. 16, 2008

(65) Prior Publication Data

US 2009/0103782 A1 Apr. 23, 2009

(30) Foreign Application Priority Data

Oct. 23, 2007 (KR) .................. 10-2007-0106781

(51) Int. Cl.
*G06K 9/00* (2006.01)
*G06K 9/34* (2006.01)

(52) U.S. Cl. .................. 382/106; 382/154; 382/173

(58) Field of Classification Search .......... 382/100, 382/103, 106, 118, 132, 145, 154, 164, 173, 382/181, 199, 209, 232, 279; 348/43; 356/326, 356/602; 701/1; 340/545.1; 345/419; 702/3
See application file for complete search history.

(56) References Cited

U.S. PATENT DOCUMENTS

| | | | | |
|---|---|---|---|---|
| 6,320,978 | B1* | 11/2001 | Szeliski et al. .............. | 382/154 |
| 7,787,658 | B2* | 8/2010 | Redert .................. | 382/106 |
| 7,831,087 | B2* | 11/2010 | Harville .................. | 382/154 |
| 2004/0179739 | A1* | 9/2004 | Wilinski et al. .............. | 382/232 |
| 2005/0002559 | A1* | 1/2005 | Terauchi et al. .............. | 382/154 |
| 2007/0024614 | A1* | 2/2007 | Tam et al. .................. | 345/419 |

FOREIGN PATENT DOCUMENTS

| | | |
|---|---|---|
| KR | 10-1998-0060719 | 10/1998 |
| KR | 10-2000-0068660 | 11/2000 |
| KR | 10-2005-0058085 | 6/2005 |
| WO | WO 02/095680 | 11/2002 |

* cited by examiner

*Primary Examiner* — Samir Ahmed
*Assistant Examiner* — Mehdi Rashidian
(74) *Attorney, Agent, or Firm* — Staas & Halsey LLP

(57) ABSTRACT

A method and apparatus for obtaining depth information are provided. The method includes calculating a relative depth value between a first color pixel and a second color pixel based on values of color pixels of a color image, and calculating a depth value of a second depth pixel that belongs to a depth image corresponding to the color image, matches the second color pixel, and does not have the depth value, based on the calculated relative depth value and a depth value of a first depth value that belongs to the depth image, matching the first color pixel, and has the depth value thereof.

12 Claims, 4 Drawing Sheets

METHOD AND APPARATUS FOR OBTAINING DEPTH INFORMATION

CROSS-REFERENCE TO RELATED APPLICATIONS

This application claims the benefit of Korean Patent Application No. 10-2007-0106781, filed on Oct. 23, 2007, in the Korean Intellectual Property Office, the disclosure of which is incorporated herein in its entirety by reference.

BACKGROUND

1. Field

One or more embodiments of the present invention relate to a method of obtaining a depth value, and more particularly, to a method of obtaining a depth value of each pixel of a color image obtained by using an image capturing device such as a general camera.

2. Description of the Related Art

Depth cameras, if photographing buttons of depth cameras are manipulated, irradiate infrared light onto a subject, calculate a depth value of each point of the subject based on time taken from the time when the infrared light is irradiated onto the time when the reflected infrared light is detected, and express an image by using the calculated depth values, thereby generating and obtaining a depth image representing the object. The depth value is referred to as a distance from the depth camera.

Depth cameras calculate only a depth value of a point of an object at which infrared light irradiated by depth cameras arrive. Hence, some pixels of depth images generated by depth cameras may not have depth values. Therefore, a method of obtaining a depth value of a pixel of a depth image not having the depth value is needed.

SUMMARY

One or more embodiments of the present invention provide a method of obtaining depth information by obtaining a depth value of a pixel of a depth image not having the depth value.

One or more embodiments of the present invention also provide an apparatus for obtaining depth information by obtaining a depth value of a pixel of a depth image not having the depth value.

One or more embodiments of the present invention also provide a computer readable medium including computer readable code to control at least one processing element to implement a method of obtaining a depth value of a pixel of a depth image not having the depth value.

Additional aspects and/or advantages will be set forth in part in the description which follows and, in part, will be apparent from the description, or may be learned by practice of the invention.

According to an aspect of the present invention, there is provided a method of obtaining depth information including calculating a relative depth value between a first color pixel and a second color pixel based on values of color pixels of a color image, and calculating a depth value of a second depth pixel that belongs to a depth image corresponding to the color image, matches the second color pixel, and does not have the depth value, based on the calculated relative depth value and a depth value of a first depth pixel that belongs to the depth image, matches the first color pixel, and has the depth value thereof.

According to another aspect of the present invention, there is provided an apparatus for obtaining depth information including a first calculation unit calculating a relative depth value between a first color pixel and a second color pixel based on values of color pixels of a color image, and a second calculation unit calculating a depth value of a second depth pixel that belongs to a depth image corresponding to the color image, matches the second color pixel, and does not have the depth value, based on the calculated relative depth value and a depth value of a first depth pixel that belongs to the depth image, matches the first color pixel, and has the depth value.

According to another aspect of the present invention, there is provided a computer readable medium including computer readable code to control at least one processing element to implement a method of obtaining depth information including calculating a relative depth value between a first color pixel and a second color pixel based on values of color pixels of a color image, and calculating a depth value of a second depth pixel that belongs to a depth image matching the color image, matches the second color pixel, and does not have the depth value, based on the calculated relative depth value and a depth value of a first depth pixel that belongs to the depth image, matches the first color pixel, and has the depth value thereof.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
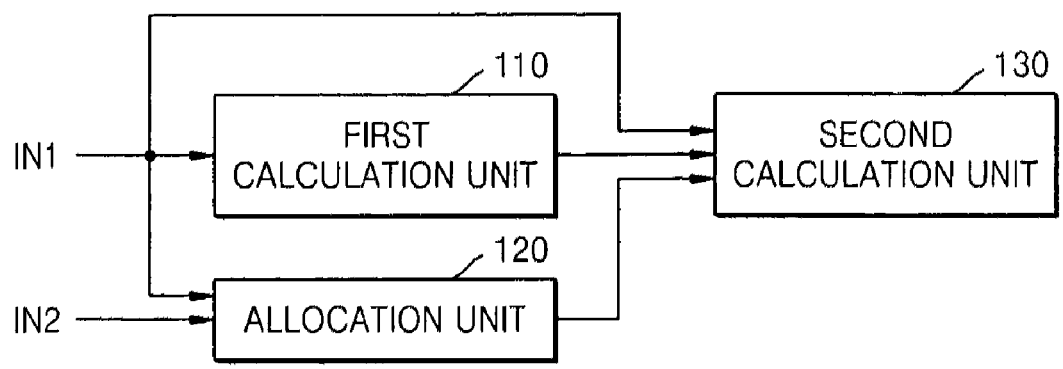
FIG. 1 is a block diagram of an apparatus for obtaining depth information, according to an embodiment of the present invention.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 is a block diagram of an apparatus for obtaining depth information according to an embodiment of the present invention. Referring to FIG. 1, the apparatus for obtaining depth information includes a first calculation unit 110, an allocation unit 120, and a second calculation unit 130. Herein, the term apparatus should be considered synonymous with the term system, and not limited to a single enclosure or all described elements embodied in single respective enclosures in all embodiments, but rather, depending on embodiment, is open to being embodied together or separately in differing enclosures and/or locations through differing elements, e.g., a respective apparatus/system could be a single processing element or implemented through a distributed network, noting that additional and alternative embodiments are equally available.

If a photographing button of a general camera (hereinafter referred to as a "charge coupled device (CCD)/complementary metal oxide semiconductor (CMOS) camera") employing a CCD or a CMOS is manipulated, the CCD/CMOS camera detects visible rays reflected from an object that receives natural light or light from a flash, for example, to generate and obtain a color image expressing the object. The color image is input into the first calculation unit 110, the allocation unit 120, and the second calculation unit 130 via an input terminal IN1.

As described above, if a photographing button of a depth camera is manipulated, the depth camera irradiates infrared light onto an object, calculates a depth value of each point of the object based on time taken from the time when the infrared light is irradiated onto the time when the reflected infrared light is detected, and expresses an image by using the calculated depth values, thereby generating and obtaining a depth image representing the object.

A color image input through the input terminal IN1 and the depth image input through an input terminal IN2 match each other. In more detail, the apparatus for obtaining depth information recognizes whether each color pixel of the color image corresponds to a depth pixel of the depth image, and, if so, recognizes which depth pixel corresponds to each color pixel. In an embodiment, the color pixel belongs to the color image input through the input terminal IN1, and the depth pixel belongs to the depth image input through the input terminal IN2. For the descriptive convenience, the color image input through the input terminal IN1 has M color pixels (M is an integer number greater than 2) in a row and N color pixels (N is an integral number greater than 2) in a column, the depth image input through the input terminal IN2 has M depth pixels in a row and N depth pixels in a column, and a color pixel of the color image where an mth row (m is an integral number $1 \leq m \leq M$) and an nth column (m is an integral number $1 \leq n \leq N$) cross each other matches a depth pixel of the depth image where an mth row and an nth column cross each other.

Meanwhile, each number of the color image input through the input terminal IN1 and the depth image input through the input terminal IN2 is 1.

The first calculation unit 110 calculates a relative depth value between a first color pixel and a second color pixel based on values of color pixels of the color image input through the input terminal IN1. In an embodiment, the first color pixel is one of color pixels of the color image input through the input terminal IN1 and a color pixel matching a first depth pixel that will be described later, and the second color pixel is one of color pixels of the color image input through the input terminal IN1 and a color pixel matching a second depth pixel that will be described later.

In detail, the first calculation unit 110 may calculate a depth value of the second color pixel with regard to a depth value of the first color pixel, and the depth value of the first color pixel with regard to the depth value of the second color pixel based on values of color pixels of the color image input through the input terminal IN1.

In more detail, the color image input through the input terminal IN1 includes one or more object images, and the first and second color pixels are included in at least a portion of the object images so that the first calculation unit 110 calculates the relative depth value between the first color pixel and the second color pixel based on each shape of the at least a portion of the object images. The object image presents at least a portion of an object that may be an animated object such as human being and an inanimate object such as a building.

For example, the first and second color pixels are included in an edge of the color image input through the input terminal IN1 so that an edge detecting unit (not shown) of the apparatus for obtaining depth information detects one or more edges from the color image, and the first calculation unit 110 calculates the relative depth value between the first color pixel and the second color pixel based on the position of each of the detected edges in the color image. In this regard, the edge detecting unit (not shown) detects color pixels that are continuously positioned in the color image as an edge if a variation in luminance value of the color image is greater than a "predetermined threshold value". For example, if an object appearing on the color image is an "object that is a building including a window", the edge detecting unit (not shown) detects, as an edge, a "boundary between a concrete surface of the building and the window" corresponding to color pixels of the color image having a variation in luminance value of the object more than a reference level.

As described above, some of the depth pixels of the depth image input through the input terminal IN2 do not have a depth value when the depth image is generated. In an embodiment, a first depth pixel is one of depth pixels of the depth image input through the input terminal IN2, matches the first color pixel, and has a depth value when the depth image is generated, whereas a second depth pixel is one of depth pixels of the depth image input through the input terminal IN2, matches the second color pixel, and does not have a depth value when the depth image is generated.

The allocation unit 120 allocates the depth value of the first depth pixel to the first color pixel. In more detail, the allocation unit 120 determines the depth value of the first depth pixel when the depth image is generated as a depth value of the first color pixel.

The second calculation unit 130 calculates a depth value of the second depth pixel based on the relative depth value between the first color pixel and the second color pixel calculated by the first calculation unit 110 and the depth value of the first color pixel determined by the allocation unit 120. That is, the second calculation unit 130 calculates a depth value of the second depth pixel based on the relative depth value between the first color pixel and the second color pixel calculated by the first calculation unit 110 and the depth value of the first depth pixel. According to the present embodiment, it is possible to obtain a depth value of a depth pixel that is one of depth pixels of the depth image and does not have a depth value when the depth image is generated.

The first calculation unit 110 cannot calculate a relative depth value with regard to one of the color pixels. For example, if the first calculation unit 110 just calculates the relative depth value between the first color pixel and the second color pixel that are included on an edge of the color image, the first calculation unit 110 cannot calculate a relative depth value with regard to a first color pixel or a second color pixel that is not included on an edge of the color image. In an embodiment, a third color pixel is a first color pixel or a second color pixel of which relative depth value cannot be calculated by the first calculation unit 110, and a third depth pixel is a depth pixel matching the third color pixel. The second calculation unit 130 cannot receive the relative depth value of the third color pixel from the first calculation unit 110 and thus cannot calculate a depth value of the third depth pixel based on the relative depth value of the third color pixel. However, the second calculation unit 130 can interpolate the depth value of the third depth pixel using a plurality of depth values among depth values of first depth pixels and calculated depth values of second depth pixels.

Figure 2A:
FIG. 2A is a color image input through the input terminal.
Figure 2B:
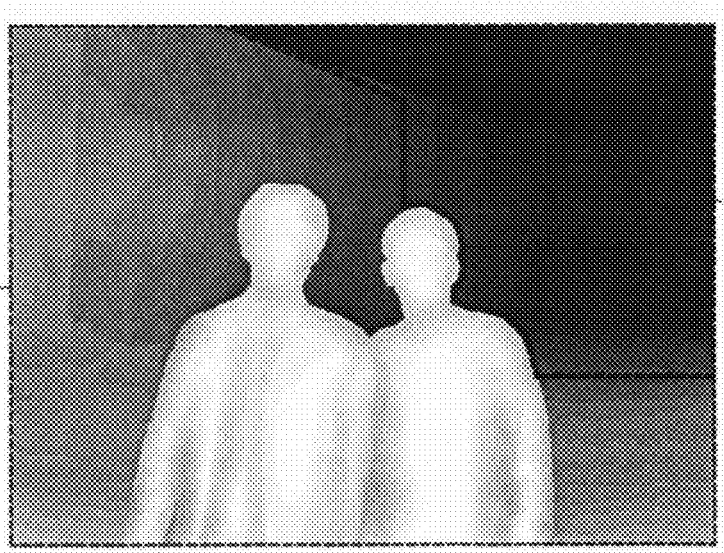
FIG. 2B is a depth image input through the input terminal.

FIG. 2A is a color image 210 input through the input terminal IN1. FIG. 2B is a depth image 220 input through the input terminal IN2.

Referring to FIGS. 2A and 2B, the color image 210 presents objects of "a building, a plurality of cars in front of the building, and two persons in front of the building". That is, the color image 210 presents an object "building", objects "cars", and objects "persons".

The color image 210 includes a first color area 212 and a second color area 214. The depth image 220 includes a first depth area 222 and a second depth area 224. In an embodiment, the first color area 212 is an area including first color pixels, and the second color area 214 is an area including second color pixels. Likewise, the first depth area 222 is an area including first depth pixels, and the second depth area 224 is an area including second depth pixels.

Figure 3:
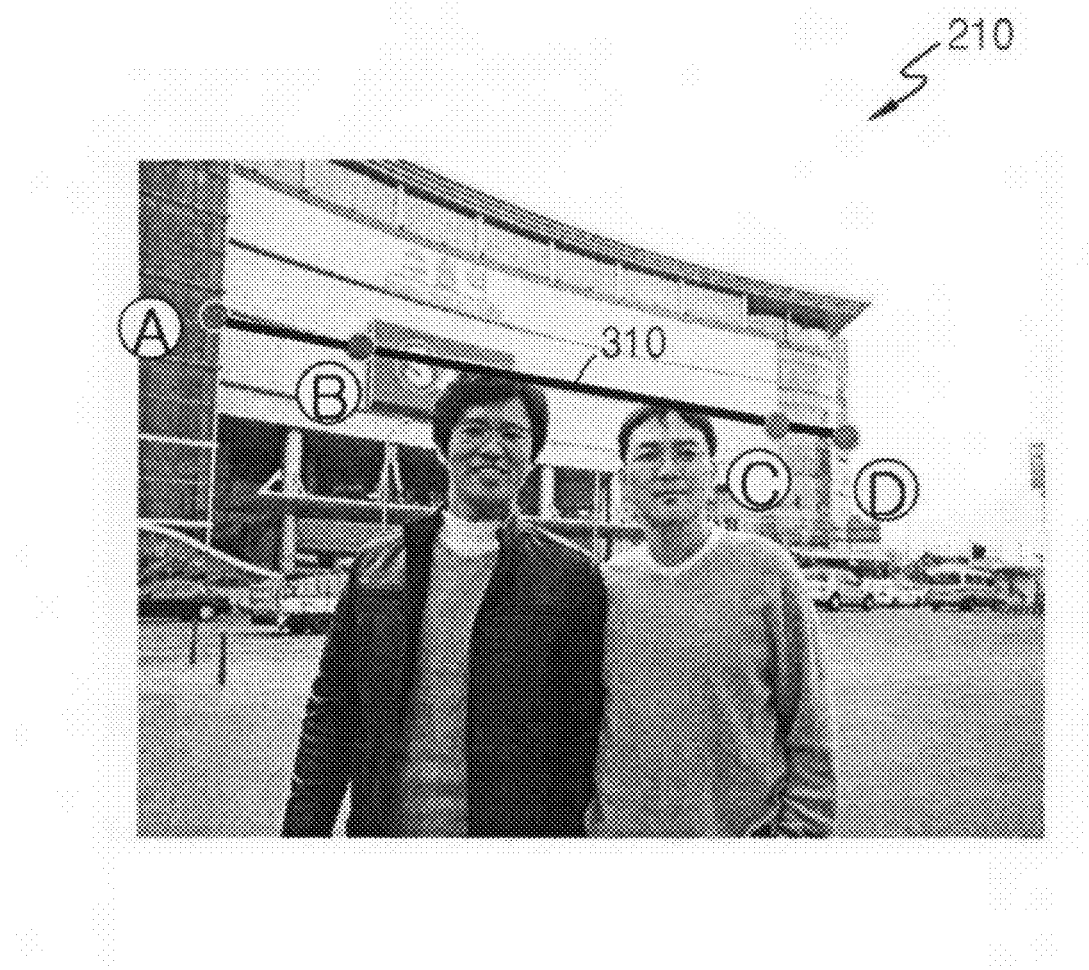
FIG. 3 is an image for explaining the apparatus for obtaining depth information by using bars illustrated in FIGS. 2A and 2B.

FIG. 3 is an image for explaining the apparatus for obtaining depth information by using bars illustrated in FIGS. 2A and 2B. Referring to FIG. 3, A and B are first color pixels and C and D are second color pixels, which are all included on an edge 310 within an "object image presenting the building" of the color image 210, and have depth values of 2 m, 4 m, 20 m, and 30 m, respectively. When the depth image 220 is generated, a first depth pixel of the depth image 220 matching A substantially has a depth value (2 m), and another first depth pixel of the depth image 220 matching B substantially has a depth value (4 m), whereas second depth pixels of the depth image 220 matching C and D do not substantially have a depth value.

The first calculation unit 110 calculates a relative depth value between the first color pixel (A or B) and the second color pixel (C or D) based on the position of each of one or more edges of the object image presenting the building in the color image 210. For example, the first calculation unit 110 can calculate a "depth value (=10) of C with regard to a depth value of A", a "depth value (=15) of D with regard to the depth value of A", a "depth value (=5) of C with regard to a depth value of B", and a "depth value (=7.5) of D with regard to the depth value of B".

The allocation unit 120 determines the depth value of A as 2 m and the depth value of B as 4 m.

The second calculation unit 130 can calculate the depth value (=10 m) of C based on the "depth value (=10) of C with regard to the depth value of A" and a "depth value of A (=1 m)", and the "depth value (=5) of C with regard to a depth value of B" and a "depth value of B (=2 m)".

Likewise, the second calculation unit 130 can calculate the depth value (=15 m) of D based on the "depth value (=15) of D with regard to the depth value of A" and the "depth value of A (=1 m)", and the "depth value (=7.5) of D with regard to the depth value of B" and the "depth value of B (=2 m)".

Figure 4:
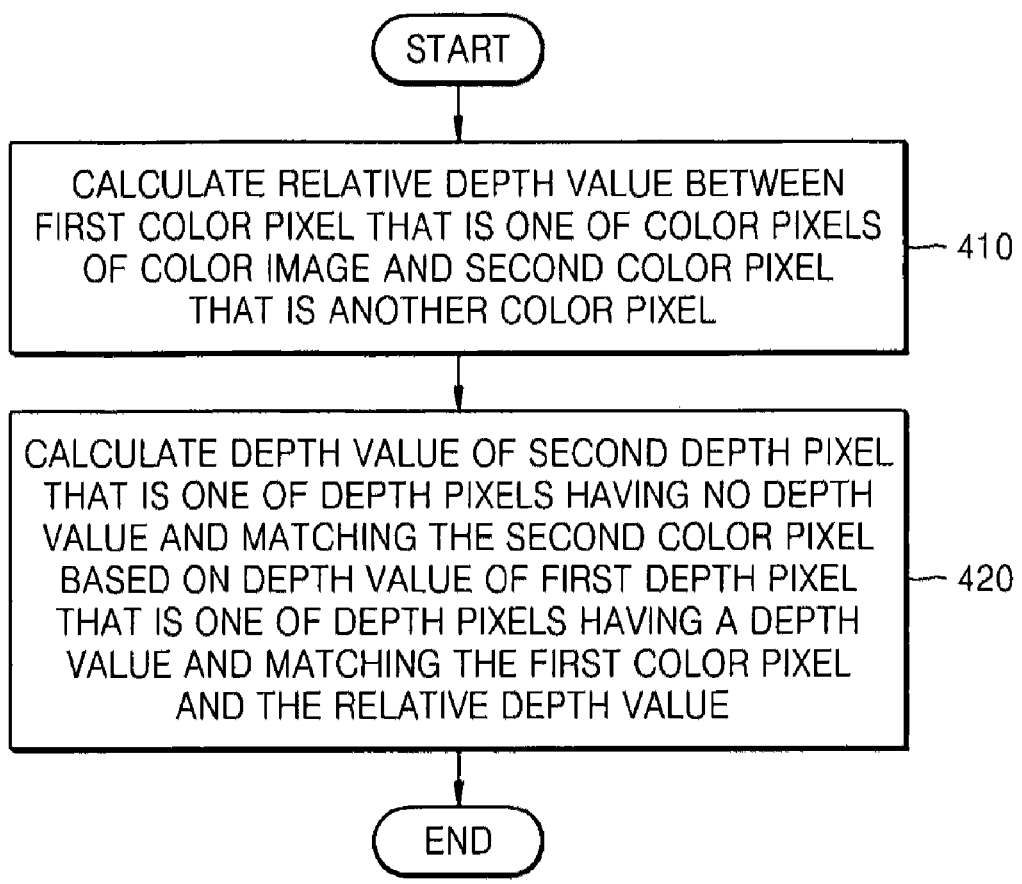
FIG. 4 is a flowchart illustrating a method of obtaining depth information, according to an embodiment of the present invention.

FIG. 4 is a flowchart illustrating a method of obtaining depth information, according to an embodiment of the present invention. The flowchart may include operations (410 and 420) of obtaining depth values of pixels of a depth image having no depth values thereof.

The first calculation unit 110 calculates a relative depth value between a "first color pixel that is one of color pixels of a color image" and a "second color pixel that is another color pixel" (operation 410).

The second calculation unit 130 calculates a depth value of a "second depth pixel that is one of depth pixels having no depth value and matching the second color pixel" based on a "first depth value that is one of depth pixels having a depth value and matching the first color pixel" and the relative depth value calculated in operation 410 (operation 420).

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as media carrying or controlling carrier waves as well as elements of the Internet, for example. Thus, the medium may be such a defined and measurable structure carrying or controlling a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

While aspects of the present invention has been particularly shown and described with reference to differing embodiments thereof, it should be understood that these exemplary embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of obtaining depth information, the method comprising:
    calculating a relative depth value between a first color pixel and a second color pixel based on values of color pixels of a color image; and
    calculating, in a depth image, a second depth value of a second depth pixel, based on the calculated relative depth value and a first depth value of a first depth pixel,
    wherein the second depth pixel in the depth image matches the second color pixel, and does not have the second depth value,
    wherein the first depth pixel belongs to the depth image, matches the first color pixel, and has the first depth value.

2. The method of claim 1, wherein the depth value of the first depth pixel is provided with the first depth pixel when the depth image is generated, and the depth value of the second depth pixel is not provided with the second depth pixel when the depth image is generated.

3. The method of claim 1, wherein one depth image and one color image are inputted at a time.

4. The method of claim 1, wherein the first and second color pixels are included in at least a portion of one or more object images of the color image,
    wherein the calculating of the relative depth value is based on each shape of the at least a portion of one or more object images.

5. The method of claim 1, further comprising determining the depth value of the first depth pixel as the depth value of the first color pixel,
 wherein the calculating of the depth value of the second depth pixel is based on the calculated relative depth value and the determined depth value.

6. An apparatus for obtaining depth information, the apparatus comprising:
 a first calculation unit calculating a relative depth value between a first color pixel and a second color pixel based on values of color pixels of a color image; and
 a second calculation unit calculating, in a depth image, a second depth value of a second depth pixel, based on the calculated relative depth value and a first depth value of a first depth pixel,
 wherein the second depth pixel in the depth image matches the second color pixel, and does not have the second depth value,
 wherein the first depth pixel belongs to the depth image, matches the first color pixel, and has the first depth value.

7. The apparatus of claim 6, wherein the depth value of the first depth pixel is provided with the first depth pixel when the depth image is generated, and the depth value of the second depth pixel is not provided with the second depth pixel when the depth image is generated.

8. The apparatus of claim 6, wherein one depth image and one color image are inputted at a time.

9. The apparatus of claim 6, wherein the first and second color pixels are included in at least a portion of one or more object images of the color image,
 wherein the first calculation unit calculates the relative depth value based on each shape of the at least a portion of one or more object images.

10. The apparatus of claim 6, further comprising an allocation unit determining the depth value of the first depth pixel as the depth value of the first color pixel,
 wherein the second calculation unit calculates the depth value of the second depth pixel based on the calculated relative depth value and the determined depth value.

11. A non-transitory computer readable medium storing computer readable code to control at least one processing element to implement the method of claim 1.

12. A method for obtaining depth information, the method comprising:
 generating a color image and a depth image;
 matching a first depth pixel with a first color pixel of the color image, and matching a second depth pixel with a second color pixel of the color image; and
 calculating a second depth value of the second depth pixel, based on a first depth value of the first depth pixel and a relative depth value between the first color pixel and the second color pixel,
 wherein the depth image comprises the first depth pixel having the first depth value and the second depth pixel having no second depth value.

* * * * *